UNITED STATES PATENT OFFICE.

LEWIS JOHN MURRAY, OF BIRMINGHAM, COUNTY OF WARWICK, ENGLAND.

MANUFACTURE OF GLASSWARE.

SPECIFICATION forming part of Letters Patent No. 309,731, dated December 23, 1884.

Application filed August 6, 1884. (Specimens.) Patented in England November 8, 1883, No. 5,286.

*To all whom it may concern:*

Be it known that I, LEWIS JOHN MURRAY, a subject of the Queen of Great Britain, residing at Birmingham, county of Warwick, England, have invented certain new and useful Improvements in the Manufacture of Glassware, (for which I have obtained a patent in Great Britain numbered 5,286, and dated November 8, 1883,) of which the following is a specification.

This improvement in the manufacture of glassware relates to a process of ornamentation of the same, by which varied and beautiful effects are produced in the finished articles.

It consists, as a preliminary stage of the manufacture, in forming the glass into a hollow vessel in the usual manner, preferably in the form of what is technically called a "cup," using either one kind of glass only, of any desired kind or color; or said cup may consist of two or more layers of glass of different degress of transparency or opacity or color.

To produce the desired design and effect in the article when finished, certain parts of the cup are removed by the process or processes of cutting, etching, engraving, sand-blasting, or any other suitable method. The parts of the cup then removed will be of such form and depth as to produce the desired design on the finished article when the cup is submitted to the subsequent process, hereinafter set forth, said cutting or removal of the glass extending through one, two, or more layers of the colored glasses, when such are used in the formation of the cup, either from the inner or outer surface, or the inner and outer surfaces of the same, according to the requirements of the design. After the embryo design is thus formed in the body of the glass of the cup, the article may be completed by simply heating the cup to the requisite degree, attaching it to a pontil and working it into the desired shape in the usual manner, by which process the whole surface of the finished article becomes glazed; but I propose in some cases, instead of simply heating and forming the cup into the desired shape, that after it is heated until capable of forming intimate union with molten glass, to line or cover, or line and cover it with glass in the ordinary manner, such lining or covering being of any kind of plain or colored glass. thus producing pleasing and more varied effects when the cup is worked up with a pontil into the shape of the article to be made, and at the same time perfectly glazing the whole surface of the finished article; and also, in some cases, I propose to make use of a second cup of transparent glass, to incase the decorated vessel or cup in such a manner as to preserve and increase the brilliancy of the effect of the pattern or design formed in the body of the glass, as described.

By means of this invention ornamental glassware possessing beautiful and pleasing effects is produced by variations of shade, color, and opacity in the design, with the surface of the same smooth and glazed.

What I claim, and desire to secure by Letters Patent, is—

1. The improved process of manufacturing ornamental glassware, which consists, first, in making a hollow vessel or cup of one or more pieces or layers of glass differing in transparency, shade, or color, removing from the inner or outer surface, or inner and outer surfaces, certain parts of the cup, or of one, two, or more of the layers of glass of which it is composed, and then forming said cup into the desired shape, substantially as hereinbefore set forth.

2. The improved process of manufacturing ornamental glassware, which consists, first, in making a hollow vessel or cup of one or more pieces or layers of glass differing in transparency, shade, or color, removing from the inner or outer surface, or inner and outer surfaces, certain parts of the cup, or of one, two, or more of the layers of glass of which it is composed, then heating the cup until capable of forming intimate union with molten glass, and covering the same with a suitable glass in the usual manner, and then forming said cup into the desired shape, substantially as set forth.

3. The improved process of manufacturing ornamental glassware, which consists, first, in making a hollow vessel or cup of one or more pieces or layers of glass differing in transparency, shade, or color, removing from the inner or outer surface, or inner and outer surfaces, certain parts of the cup, or of one, two, or more of the layers of glass of which it is composed, then incasing said hollow vessel or
5 cup in a second cup of transparent glass and forming the whole into the desired shape, substantially as set forth.

In testimony whereof I have hereunto set my hand, at Birmingham, county of Warwick, England, this 25th day of July, 1884.

LEWIS JOHN MURRAY.

Witnesses:
JAMES RICHARDS,
REUBEN PLANT.
*Both of Sohot Vesta Glass Wks., Birmingham.*